(12) United States Patent
Dellock et al.

(10) Patent No.: US 11,479,303 B2
(45) Date of Patent: Oct. 25, 2022

(54) CO-EXTRUDED ROLL-FORMED ROOF DITCH MOLDING WITH END FORMED FEATURE

(71) Applicant: Ford Global Technologies, LLC, Dearborn, MI (US)

(72) Inventors: Paul Kenneth Dellock, Northville, MI (US); David Brian Glickman, Southfield, MI (US); Stuart C. Salter, White Lake, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 17/076,066

(22) Filed: Oct. 21, 2020

(65) Prior Publication Data
US 2022/0119041 A1 Apr. 21, 2022

(51) Int. Cl.
*B62D 65/00* (2006.01)
*B62D 25/07* (2006.01)
*B21D 53/88* (2006.01)

(52) U.S. Cl.
CPC ............. *B62D 25/07* (2013.01); *B21D 53/88* (2013.01); *B62D 65/00* (2013.01)

(58) Field of Classification Search
CPC ........ B62D 25/07; B62D 65/00; B21D 53/88; B21D 5/08; B21D 28/02; B21D 35/00; B29C 48/00; B29C 2793/0009; B60R 13/04
See application file for complete search history.

(56) References Cited

U.S. PATENT DOCUMENTS

| 6,210,615 B1 * | 4/2001 | Yoshizuru | B60R 13/04 |
| | | | 264/296 |
| 7,604,287 B2 * | 10/2009 | Mourou | B60R 13/04 |
| | | | 296/213 |
| 2014/0041196 A1 | 2/2014 | Bae et al. | |

FOREIGN PATENT DOCUMENTS

KR 19990027520 U 7/1999

* cited by examiner

*Primary Examiner* — Lee A Holly
(74) *Attorney, Agent, or Firm* — Vichit Chea; Carlson, Gaskey & Olds, P.C.

(57) ABSTRACT

An apparatus and method, according to an exemplary aspect of the present disclosure includes, among other things, cutting opposing notches in side edges of a flat metallic strip to provide a flat notched strip with pairs of notches extending along a length of the flat notched strip. The flat notched strip is rolled formed to provide a profiled notched strip and a flexible material is extruded to cover the profiled notched strip to provide a roof ditch molding. The roof ditch molding is cut at notch locations to achieve a desired molding length extending between molding cut ends comprising tabs, and a pattern of flexible material is removed from the notches associated with the molding cut ends. The tabs are bent to provide final formed ends for the roof ditch molding.

17 Claims, 5 Drawing Sheets

CO-EXTRUDED ROLL-FORMED ROOF DITCH MOLDING WITH END FORMED FEATURE

TECHNICAL FIELD

This disclosure relates generally to a method and apparatus to provide a roof ditch molding that includes end formed features that eliminate the need for end caps.

BACKGROUND

Vehicles can include roll formed roof ditch moldings that are overmolded with a soft material to seal along the side of the roof. The moldings often have end caps that are separately attached to provide a finished look. Forming and installing separate end caps is labor intensive and cost prohibitive. Other roof ditch moldings have stamped ends that are formed by taking an existing formed/extruded roof ditch molding and notching away edges of the ditch molding to form the end of the ditch molding. Stamping processes are labor intensive and can have high scrap rates.

SUMMARY

A method according to an exemplary aspect of the present disclosure includes, among other things: cutting opposing notches in side edges of a flat metallic strip to provide a flat notched strip with pairs of notches extending along a length of the flat notched strip; roll forming the flat notched strip to provide a profiled notched strip; extruding a flexible material to cover the profiled notched strip to provide a roof ditch molding; cutting the roof ditch molding at notch locations to achieve a desired molding length extending between molding cut ends comprising tabs, and removing a pattern of flexible material from the notches associated with the molding cut ends; and bending the tabs to provide final formed ends for the roof ditch molding.

In a further non-limiting embodiment of the foregoing method, the flat metallic strip has opposing side edges extending along the length of the flat metallic strip and spaced apart from each other by a width of the flat metallic strip, and wherein a first notch is cut in one of the opposing side edges and a second notch is cut in the other of the opposing side edges in alignment with the first notch across the width to form one pair of the notches, and wherein additional pairs of notches are formed spaced apart from each other along the length to form the flat notched strip.

In a further non-limiting embodiment of any of the foregoing methods, the pattern of flexible material that is removed from the notches comprises a triangular pattern such that tapering surfaces are provided from each side edge of the roof ditch molding toward distal ends of the tabs.

In a further non-limiting embodiment of any of the foregoing methods, the method includes placing the roof ditch molding in a stretch bending machine, forming the roof ditch molding to fit a contour of a roof, and bending the tab at each molding cut end to provide the final formed ends.

In a further non-limiting embodiment of any of the foregoing methods, the flat metallic strip is made from an aluminum material and wherein the flexible material comprises plastic.

A method, according to yet another exemplary aspect of the present disclosure includes, among other things: forming a flat metallic strip; forming notches in the flat metallic strip to provide a flat notched strip; roll forming the flat notched strip to provide a profiled notched strip; extruding a flexible material to cover the profiled notched strip to provide a co-extruded roll-formed roof ditch molding; cutting the co-extruded roll-formed roof ditch molding to a desired length to provide a roof ditch molding having cut ends that are at notch locations to provide tabs at each cut end; removing a pattern of flexible material from the notches associated with the cut ends; and bending the tabs to provide final formed ends for the roof ditch molding.

In a further non-limiting embodiment of any of the foregoing methods, the flat metallic strip is made from an aluminum material.

In a further non-limiting embodiment of any of the foregoing methods, the flexible material comprises plastic.

In a further non-limiting embodiment of any of the foregoing methods, the method includes uncoiling a continuous metallic strip from a coil and passing the continuous metallic strip through a flattener to provide the flat metallic strip.

In a further non-limiting embodiment of any of the foregoing methods, the method includes passing the flat metallic strip through a take-up loop or limiter to allow a downstream portion of the flat metallic strip to be stopped long enough to form notches in the flat metallic strip while keeping an uncoiling rate of the continuous metallic strip consistent.

In a further non-limiting embodiment of any of the foregoing methods, the method includes feeding the downstream portion of the flat metallic strip into a hydraulic punch to form notches along a length of the flat metallic strip such that the flat notched strip is formed.

In a further non-limiting embodiment of any of the foregoing methods, the method includes forming the profiled notch strip to have a C-section profile in a roll form mill, extruding the flexible material to be molded over and cover an entirety of the C-section profile to form the co-extruded roll-formed roof ditch molding, and feeding the co-extruded roll-formed roof ditch molding into a cutter.

In a further non-limiting embodiment of any of the foregoing methods, the pattern of flexible material that is removed from the cut ends comprises a triangular pattern such that tapering surfaces are provided from each side edge of the roof ditch molding toward distal ends of the tabs.

In a further non-limiting embodiment of any of the foregoing methods, the method includes placing the roof ditch molding in a stretch bending machine, forming the molding to fit a contour of a roof, and bending the tab at each end of the roof ditch molding to provide final formed ends.

In a further non-limiting embodiment of any of the foregoing methods, the flat metallic strip has opposing side edges extending along a length of the flat metallic strip and spaced apart from each other by a width of the flat metallic strip, and wherein a first notch is cut in one of the opposing side edges and a second notch is cut in the other of the opposing side edges in alignment with the first notch across the width to form one pair of notches, and wherein additional pairs of notches are formed spaced apart from each other along the length to form the flat notched strip.

In a further non-limiting embodiment of any of the foregoing methods, the pattern of flexible material that is removed from the notches comprises a triangular pattern such that tapering surfaces are provided from each side edge of the roof ditch molding toward distal ends of the tabs.

In a further non-limiting embodiment of any of the foregoing methods, the method includes bending the tab at each cut end to provide the final formed ends.

An apparatus, according to yet another exemplary aspect of the present disclosure includes, among other things, a first cutter to cut opposing notches in side edges of the flat metallic strip to provide the flat notched strip with pairs of notches extending along a length of the flat notched strip. A roll forming mill receives the flat notched strip and roll forms the flat notched strip to provide the profiled notched strip. An extruder receives the profiled notched strip and extrudes the flexible material to cover the profiled notched strip to provide the roof ditch molding. A second cutter cuts the roof ditch molding at notch locations to achieve the desired length extending between the cut ends comprising the tabs, and removes the pattern of flexible material from the notches associated with the cut ends. A stretch bender forms the roof ditch molding to fit a contour of a vehicle roof and bends the tabs to provide final formed ends for the roof ditch molding.

An apparatus, according to yet another exemplary aspect of the present disclosure includes, among other things, a pre-notched strip that is formed to have a profile extending between notches provided at opposing strip ends that each include a tab. A flexible material covers the profile such that an entirety of the pre-notched strip is covered with the flexible material to comprise a roof ditch molding configured to fit along an edge of a vehicle roof. The flexible material provides tapered surfaces that extend from each side edge of the roof ditch molding toward a distal end of the tabs. Each tab is configured to provide a bent portion that forms a finished end for the roof ditch molding.

In a further non-limiting embodiment of any of the foregoing apparatus, the profile comprises a C-profile.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary roof ditch molding that includes notches that are pre-formed prior to roll-forming and extruding to provide a finished end feature of the molding that does not require end caps.

Figure 1:
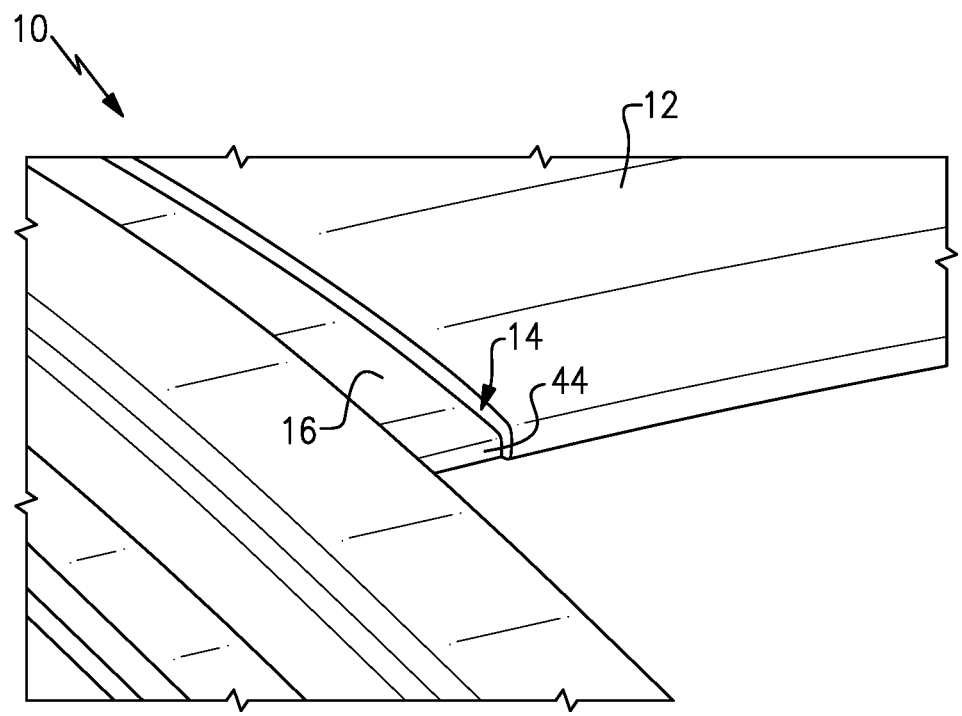
FIG. 1 illustrates a perspective view of a vehicle roof having a roof ditch molding assembly with final formed ends.

With reference to FIG. 1, a vehicle 10 has a roof 12 that includes a channel referred to as a roof ditch 14. The roof ditch 14 is a channel within the roof 12 that directs water away from sides of the vehicle and may also include the attachment weld securing the roof to the vehicle. A ditch molding assembly 16 covers the roof ditch 14 and provides a desired aesthetic appearance as well as providing water management functions.

Figure 2:
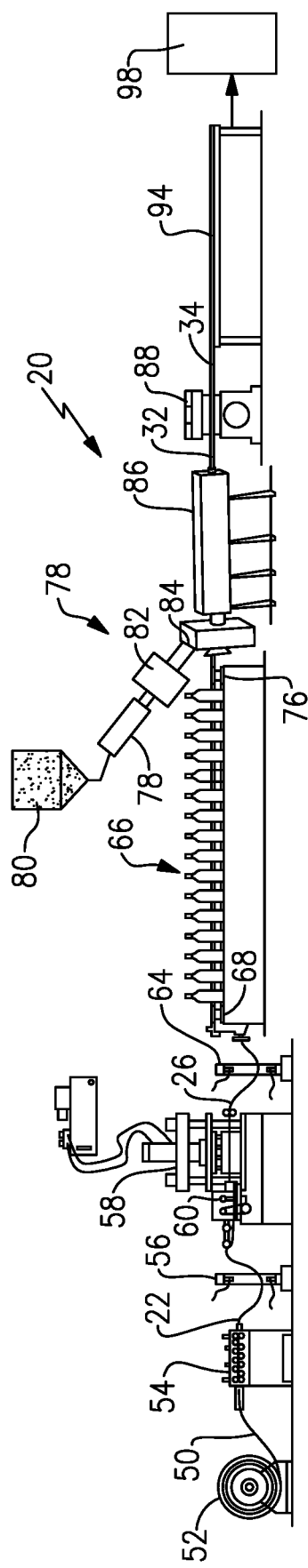
FIG. 2 shows a schematic representation of an apparatus that is used to make the roof ditch molding assembly of FIG. 1.
Figure 3:
FIG. 3 is a top view of a flat metallic strip that is used to form the roof ditch molding assembly.
Figure 4:
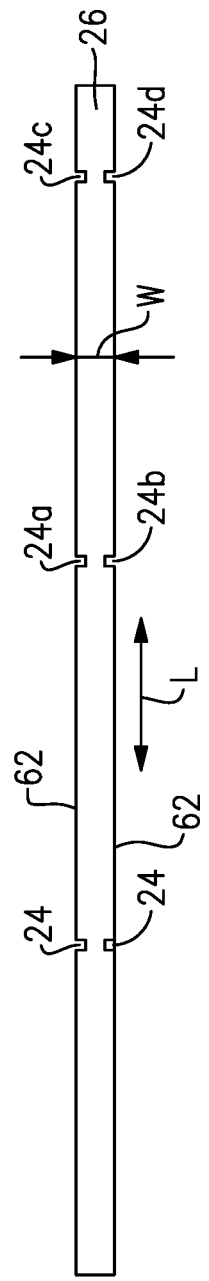
FIG. 4 is a top view of a flat notched strip that is formed from the flat metallic strip.
Figure 5:
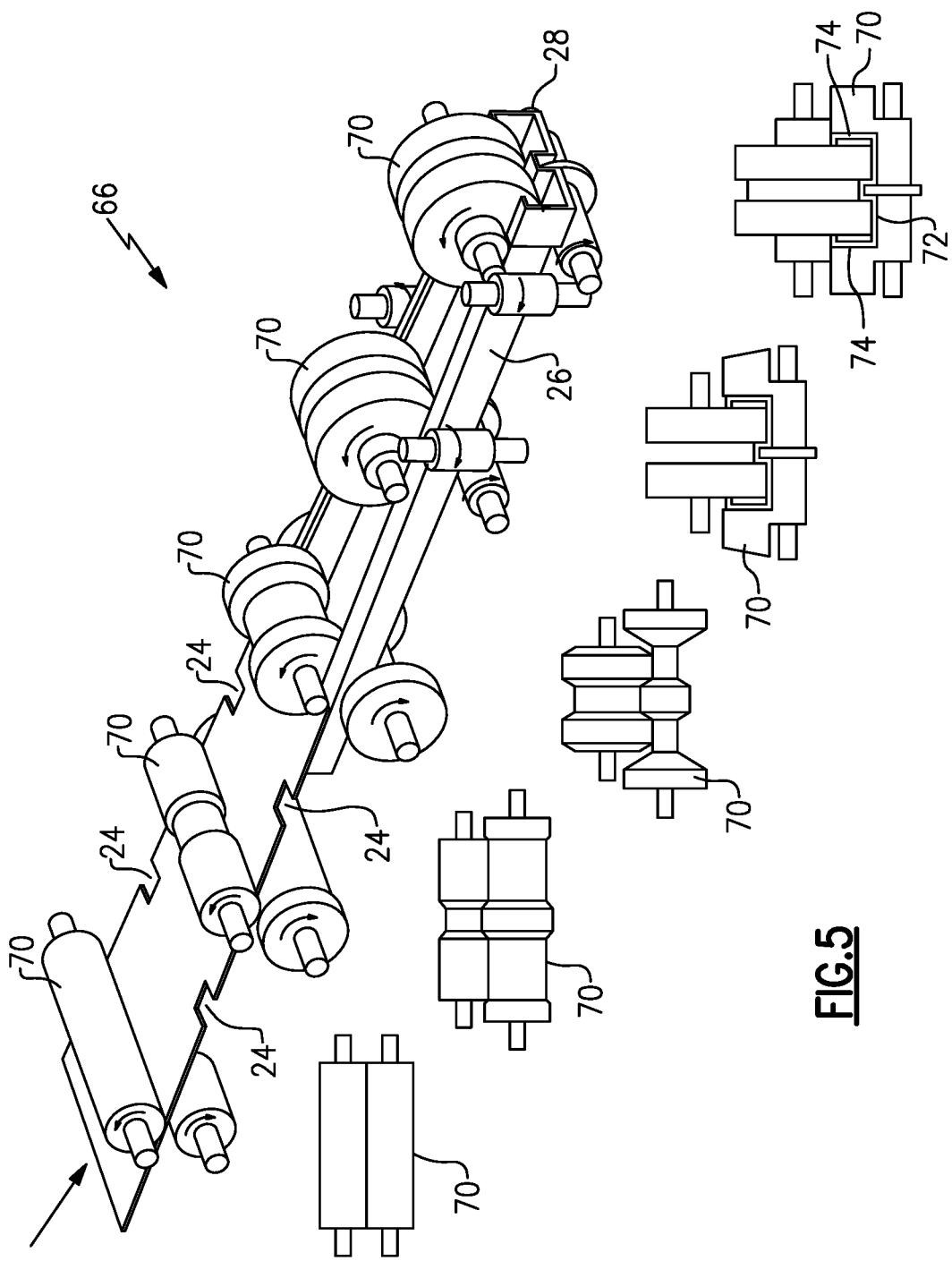
FIG. 5 is a perspective view of a roll forming device that forms the flat notched strip into a profiled notched strip.
Figure 6:
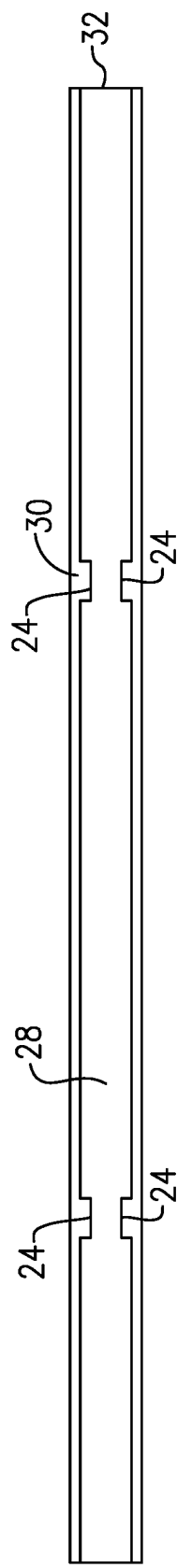
FIG. 6 is a top view of the profiled notched strip with a soft flexible material extruded over an entirety of the profiled notched strip.
Figure 7:
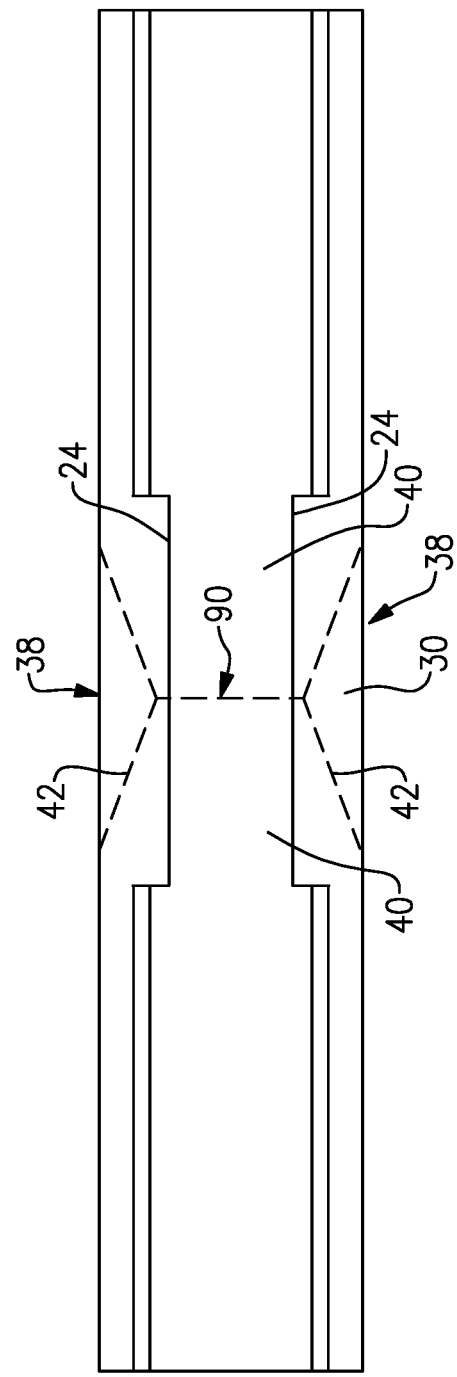
FIG. 7 is an enlarged view of a portion of the profiled notched strip of FIG. 6 showing a cut pattern in a notch location.

An apparatus 20 for making the roof ditch molding assembly 16 is shown in FIG. 2. A method of making the roof ditch molding assembly 16 using the apparatus 20 includes first forming a flat metallic strip 22 as shown in FIG. 3. The apparatus 20 includes a cutting device that then form notches 24 in the flat metallic strip 22 to provide a flat notched strip 26 as shown in FIG. 4. After the notched strip 26 is formed, it is fed into a roll form mill to provide a profiled notched strip 28 as shown in FIG. 5. Next, a flexible material 30 is extruded over the profiled notched strip 28 to cover the profiled notched strip 28 to provide a co-extruded roll-formed roof ditch molding 32 as shown in FIG. 6. The co-extruded roll-formed roof ditch molding 32 is then cut to a desired length to provide a roof ditch molding 34 having cut ends 36 (FIG. 8A) that are at notch locations 38 (FIG. 7) to provide tabs 40 at each cut end 36. A pattern 42 of flexible material 30 is removed from the notches 24 associated with the cut ends 36 as shown in FIG. 7. The tabs 40 are then bent to provide final formed ends 44 for the roof ditch molding assembly as shown in FIG. 1.

In one example, the flat metallic strip 22 is made from an aluminum material. In one example, the flexible material 30 comprises a plastic material. Other types of material could also be used to form the strip and to provide the flexible covering material.

In one example, the process starts by uncoiling a thin continuous strip of aluminum 50 from a coil 52 as shown in FIG. 2. The thin continuous strip of aluminum 50 is de-coiled at a constant speed, for example. The aluminum strip 50 passes through a leveling device or flattener 54 to make sure the strip 50 is flat to provide the flat metallic strip 22 (FIG. 3). Next, the continuous flat metallic strip 22 passes through a take-up loop or limiter 56 to regulate material flow/speed. This allows the flat metallic strip 22 to stop, i.e. be held in place, long enough to form the notches 24 in the strip 22 while keeping the de-coiling rate consistent, and to provide the flat notched strip 26.

To form the notches 24, the strip 22 is fed into a hydraulic punch 58 via rollers 60, and the strip 22 is stopped/held such the notches 24 can be punched into the strip to form the flat notched strip 26. Thus, at this point in the process a continuous notched strip 26 is provided where the notches 24 are spaced along the length of the strip 26 (FIG. 4). The notches 24 are pre-punched to remove excess strip material prior to any extrusion or roll forming process.

In one example shown in FIG. 4, the flat notched strip 26 has opposing side edges 62 that extend along a length L of the flat notched strip 26 and which are spaced apart from each other by a width W of the flat notched strip 26. In one example, the notches 24 are formed in each of the opposing side edges 62 as pairs such that pairs of notches 24 are spaced apart from each other in a first direction along the length L of the flat notched strip 26, with notches in each pair of notches being aligned with each other in a second direction across the width W of the flat notched strip 26. Thus, for example, a first pair of notches 24a, 24b are aligned with each other across the width W of the strip 26 and a second pair of notches 24c, 24d are aligned with each other across the width W of the strip 26, where the first pair of notches 24a, 24b are spaced apart form the second pair of notches 24c, 24d along the length L of the strip 26.

Next, the flat notched strip 26 passes through another take-up loop 64 that is used to regulate material flow/speed to a roll form mill 66. The strip 26 passes through a guide 68 that lines up the strip 26 for the roll form mill 66. The strip 26 is fed into the roll form mill 66 and is transformed from a flat strip into the profiled strip 28 using a series of rollers 70 as shown in FIG. 5. In one example, the rollers 70 are configured to transform the flat strip into a profiled strip that has a C-section. The C-section has a base portion 72 with flanges 74 extending upwardly away from opposite edges of the base portion 72.

Next, the profiled notched strip 28 passes through a straightener 76 that squares up the profile and guides the profiled notched strip 28 into an extruder 78. In the extrusion process, the flexible material 30, such as a soft plastic skin for example, is over-molded over strip 28 to cover the C-section. In one example, a soft raw plastic material like thermoplastic elastomer (TPE) or thermoplastic polyurethane (TPU) granules, pellets, or powder are loaded into a hopper 80 and are then fed into the long, heated cylindrical extruder 78. The material is moved through this extruder chamber by a revolving screw (not shown) and forced into an optional metering device 82, which may be used to control material flow. The molten plastic is forced through a small opening comprising a die 84 to form the shape of the finished product. The profiled notched strip 28 passes through the die 84 and a thin layer of a flexible material 30, e.g. about 0.5 mm thick, is extruded over the C-Section covering the entire profiled notched strip 28. The strip then passes through a cooling device 86. Small fins or seals (not shown) can also be molded on each side of the extrusion if needed. A co-extruded roll-formed roof ditch molding 32 is thus formed.

Figure 8A:
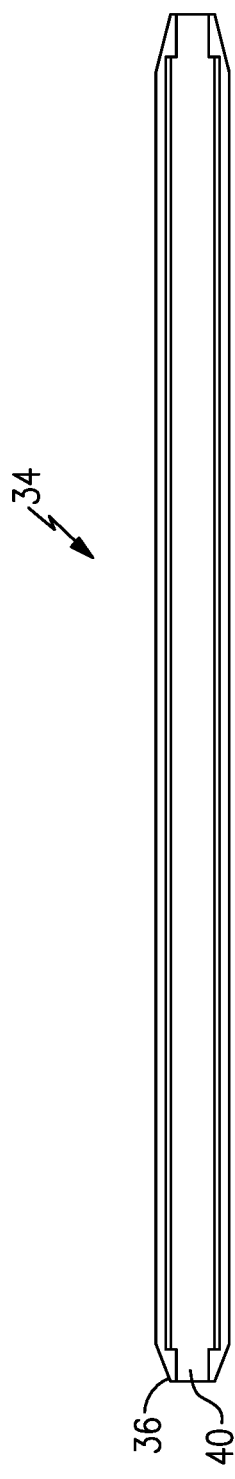
FIG. 8A shows a roof ditch molding cut to a desired length and having cut ends.
Figure 8B:
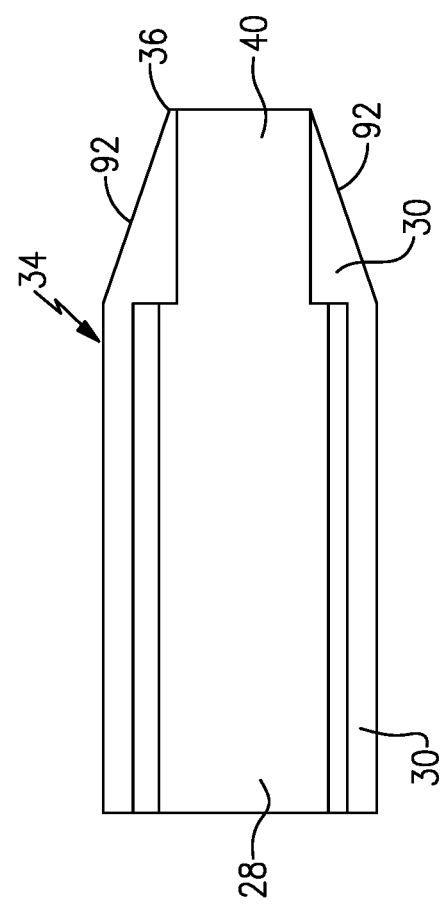
FIG. 8B is an enlarged view of one cut end of FIG. 8A and showing a tab that is to be bent to form a final formed end of the roof ditch molding assembly.

Next, the co-extruded roll-formed roof ditch molding 32 is cut to a desired length with a die cutter 88 to provide a final roof ditch molding 34 having cut ends 36 as shown in FIG. 8A. Additionally, the raw plastic over-mold is trimmed to prevent wrinkling along the edges. In one example, excess plastic material is removed in a triangular pattern 42 as shown in FIG. 7. The molding 32 is then cut at a center of the notch as indicated at 90, which forms two tabs 40. One tab 40 is for a first final roof ditch molding 34 and the other tab 40 is for a second final roof ditch molding 34. While a triangular pattern is shown, other patterns could also be used to provide varied tab configurations as needed.

Thus, the die cutter 88 not only die cuts metal but also trims away excess flexible material along the edges of the profile. When the excess material is trimmed away in the triangular pattern 42, tapering surfaces 92 are provided that extend from each side edge of the final roof ditch molding 34 toward distal ends of the tabs 40. The die cutter 88 then makes the center cut 90 and returns to grab the next section of the co-extruded roll-formed roof ditch molding 32. The cut pieces are then transferred to a runout table 94.

After the co-extruded roll-formed roof ditch molding 32 is cut to length and the excess material is removed to provide the final roof ditch molding 34, profile ends with tabs 40 are provided as shown in FIG. 8A. Next, the final roof ditch molding 34 is stretch bent in a stretch bending machine 98 to match the contour of a vehicle's roof 12, and the notched tabs 40 at the ends 36 of the final roof ditch molding 34 are formed to close off the ends of the molding and give the vehicle 10 a highly crafted look. In one example, the molding 34 is placed in the stretch bending machine 98 and is clamped in place. The molding 34 is then formed to fit the contour of the roof 12. The tabs 40 at the ends 36 of the molding 34 are then bent up to 90 degrees, for example, to provide a final formed end 44. The molding 34 is then removed from the stretch bending machine 98.

Traditional attachment brackets, clips, and foam (not shown) are still needed and assembled to the molding. However, the need for separate end caps and assembly has been eliminated. The subject roof ditch molding 34 thus offers a more clean and crafted appearance when compared to a molding with endcaps. Further, bending the tabs 40 to provide the final formed ends 44 results in significant cost savings.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method, comprising:
   forming a flat metallic strip;
   forming notches in the flat metallic strip to provide a flat notched strip;
   roll forming the flat notched strip to provide a profiled notched strip;
   extruding a flexible material to cover the profiled notched strip to provide a co-extruded roll-formed roof ditch molding;
   cutting the co-extruded roll-formed roof ditch molding to a desired length to provide a roof ditch molding having cut ends that are at notch locations to provide tabs at each cut end;
   removing a pattern of flexible material from the notches associated with the cut ends; and
   bending the tabs to provide final formed ends for the roof ditch molding.

2. The method according to claim 1, including uncoiling a continuous metallic strip from a coil and passing the continuous metallic strip through a flattener to provide the flat metallic strip.

3. The method according to claim 2, including passing the flat metallic strip through a take-up loop or limiter to allow a downstream portion of the flat metallic strip to be stopped long enough to form notches in the flat metallic strip while keeping an uncoiling rate of the continuous metallic strip consistent.

4. The method according to claim 3, including feeding the downstream portion of the flat metallic strip into a hydraulic punch to form notches along a length of the flat metallic strip such that the flat notched strip is formed.

5. The method according to claim 4, including forming the profiled notch strip to have a C-section profile in a roll form mill, extruding the flexible material to be molded over and cover an entirety of the C-section profile to form the co-extruded roll-formed roof ditch molding, and feeding the co-extruded roll-formed roof ditch molding into a cutter.

6. The method according to claim 5, wherein the pattern of flexible material that is removed from the cut ends comprises a triangular pattern such that tapering surfaces are provided from each side edge of the roof ditch molding toward distal ends of the tabs.

7. The method according to claim 6, including placing the roof ditch molding in a stretch bending machine, forming the molding to fit a contour of a roof, and bending the tab at each end of the roof ditch molding to provide final formed ends.

8. The method according to claim 1, wherein the flat metallic strip has opposing side edges extending along a length of the flat metallic strip and spaced apart from each other by a width of the flat metallic strip, and wherein a first notch is cut in one of the opposing side edges and a second notch is cut in the other of the opposing side edges in alignment with the first notch across the width to form one pair of notches, and wherein additional pairs of notches are formed spaced apart from each other along the length to form the flat notched strip.

9. The method according to claim 8, wherein the pattern of flexible material that is removed from the notches comprises a triangular pattern such that tapering surfaces are provided from each side edge of the roof ditch molding toward distal ends of the tabs.

10. The method according to claim 9, including bending the tab at each cut end to provide the final formed ends.

11. The method according to claim 1, wherein the flat metallic strip is made from an aluminum material.

12. The method according to claim 1, wherein the flexible material comprises plastic.

13. A method, comprising:
cutting opposing notches in side edges of a flat metallic strip to provide a flat notched strip with pairs of notches extending along a length of the flat notched strip;
roll forming the flat notched strip to provide a profiled notched strip;
extruding a flexible material to cover the profiled notched strip to provide a roof ditch molding;
cutting the roof ditch molding at notch locations to achieve a desired molding length extending between molding cut ends comprising tabs, and removing a pattern of flexible material from the notches associated with the molding cut ends; and
bending the tabs to provide final formed ends for the roof ditch molding.

14. The method according to claim 13, wherein the pattern of flexible material that is removed from the notches comprises a triangular pattern such that tapering surfaces are provided from each side edge of the roof ditch molding toward distal ends of the tabs.

15. The method according to claim 14, including placing the roof ditch molding in a stretch bending machine, forming the roof ditch molding to fit a contour of a roof, and bending the tab at each molding cut end to provide the final formed ends.

16. The method according to claim 13, wherein the flat metallic strip has opposing side edges extending along the length of the flat metallic strip and spaced apart from each other by a width of the flat metallic strip, and wherein a first notch is cut in one of the opposing side edges and a second notch is cut in the other of the opposing side edges in alignment with the first notch across the width to form one pair of the notches, and wherein additional pairs of notches are formed spaced apart from each other along the length to form the flat notched strip.

17. The method according to claim 13, wherein the flat metallic strip is made from an aluminum material and wherein the flexible material comprises plastic.

* * * * *